(12) United States Patent
Heggelund et al.

(10) Patent No.: US 10,204,440 B2
(45) Date of Patent: Feb. 12, 2019

(54) GRAPHICS PROCESSING

(71) Applicant: ARM Limited, Cambridge (GB)

(72) Inventors: Frode Heggelund, Trondheim (NO);
Jorn Nystad, Trondheim (NO)

(73) Assignee: Arm Limited, Cambridge (GB)

( * ) Notice: Subject to any disclaimer, the term of this patent is extended or adjusted under 35 U.S.C. 154(b) by 228 days.

(21) Appl. No.: 15/218,012

(22) Filed: Jul. 23, 2016

(65) Prior Publication Data

US 2017/0039755 A1 Feb. 9, 2017

(30) Foreign Application Priority Data

Aug. 3, 2015 (GB) .................................. 1513714.4

(51) Int. Cl.
*G06T 15/00* (2011.01)
*G06T 15/80* (2011.01)

(52) U.S. Cl.
CPC ............ *G06T 15/005* (2013.01); *G06T 15/80* (2013.01)

(58) Field of Classification Search
CPC ......... G06T 15/005; G06T 15/80; G06T 1/20; G06T 11/00; G06T 15/00; G06T 17/10; G06T 5/00; G06T 7/40; G06T 7/60; G06T 11/40; G06T 15/60; G06T 2200/04; G06T 2200/28; G06T 2210/12; G06T 3/4007; G06T 11/203; G06T 7/507; G09G 5/363; G09G 2340/0407
See application file for complete search history.

(56) References Cited

U.S. PATENT DOCUMENTS

| 2014/0028673 A1* | 1/2014 | Gregson | ................. G06T 17/20 345/420 |
| 2015/0070380 A1* | 3/2015 | Lum | ..................... G06T 15/503 345/612 |

* cited by examiner

*Primary Examiner* — Xilin Guo
(74) *Attorney, Agent, or Firm* — Vierra Magen Marcus LLP

(57) ABSTRACT

A graphics processing system generates interpolated vertex shaded attribute data for plural sampling points of plural fragments of a quad fragment that is being used to sample a primitive. The interpolated vertex shaded attribute data for the plural sampling points is generated using a reference position for the quad fragment that is defined with respect to a first coordinate system, together with rotated sampling point delta values for the primitive that are defined with respect to a second coordinate system. The rotated sampling point delta values allow the interpolated vertex shaded attribute data to be generated more efficiently for the plural sampling points.

19 Claims, 5 Drawing Sheets

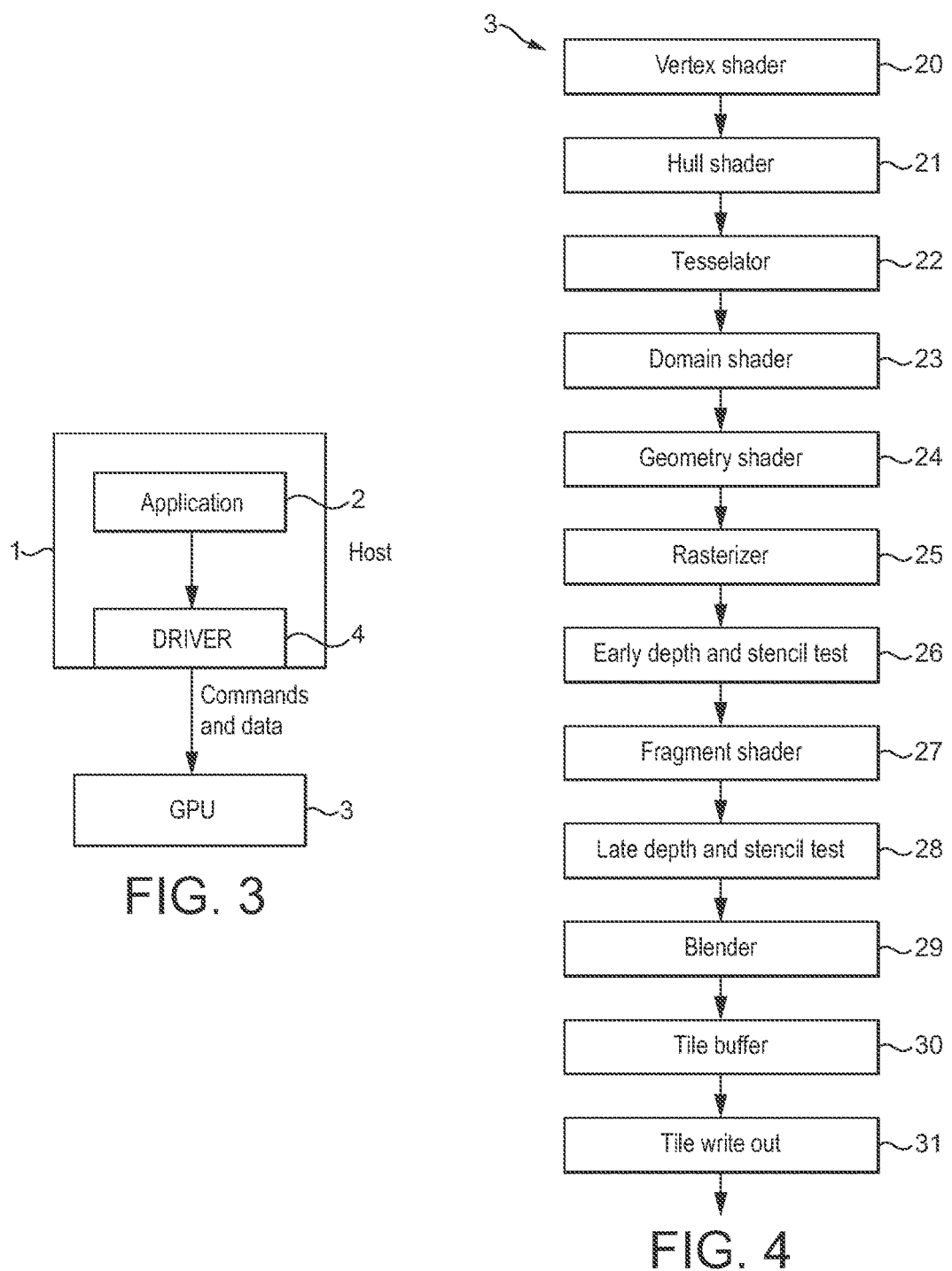

GRAPHICS PROCESSING

BACKGROUND

The technology described herein relates to graphics processing and in particular to the operation of graphics processing systems that include a fragment shading stage that generates interpolated vertex attribute data.

Graphics processing is typically carried out in a pipelined fashion, with one or more pipeline stages operating on the data to generate the final image that is displayed. Two important parts of this process typically are so-called vertex shading operations such as transformations and lighting that are carried out on the vertices of primitives (polygons) representing the image to be displayed, and the subsequent fragment (pixel) shading operations that shade (colour) the individual fragments that make up the image to be displayed.

The vertex shading operations are typically carried out in a so-called "vertex shader" stage of the graphics process. This is typically a programmable processing unit that executes vertex shader programs on input data values to generate a desired set of output data (e.g. appropriately transformed and lit vertex data) for processing by the rest of the graphics pipeline. Each primitive (polygon) of a scene is usually defined and represented as a set of vertices, with each vertex having associated with it a set of data values for the vertex. The vertex shading process modifies the initially defined data values for a vertex, e.g. based on any transformations or lighting that the primitive that the vertex relates to is to be subjected to.

Once the input data values for a scene have been vertex "shaded", the primitives representing the scene are then usually rasterised to generate a plurality of "fragments" to be processed for the scene. Fragments are the discrete graphical entities on which the graphics processing operations (such as rendering) are carried out. Each fragment will correspond to a sampling point or sampling points of the scene and, once sampled, will have associated with it the necessary data, such as red, green, blue colour (RGB) values, a transparency (alpha) value, and a depth (z) value, to allow the sample point(s) to be displayed. Fragments may also be referred to as pixels, although it is not inevitably the case that a given fragment will correspond exactly to a single pixel (pixel element) in the final display, as post-processing, such as down-scaling, may mean that there is not a one-to-one correspondence between the entities (fragments) that the graphics processing operates on and the display pixels.

The graphics fragments, once generated, undergo a number of processes to shade them to generate their final output colour, etc., values, such as interpolation of vertex data, applying textures, blending, etc. Such processes to derive the output data values, etc., e.g. necessary to display the sample point(s) that the fragments represent, may be referred to as "fragment shading" or "pixel shading" and are carried out in a fragment shader (also called a pixel shader) stage of the processing pipeline. The fragment shading process processes the initially defined fragment data values for a fragment to derive the output data for the fragment (data needed to display the sample point(s) that the fragment represents) correctly. The fragment shader again may be a programmable unit that executes one or more fragment shader programs to shade (colour) the fragments appropriately. Fragments may be processed (e.g. sampled, shaded, etc.) individually or together in groups. For example, groups of 2×2 fragments are often processed together as a "quad", although smaller or larger groups of fragments are sometimes used.

The vertex and fragment shading operations normally operate on so-called "attributes". An attribute is an input or output variable in a shader program and may represent for example, a colour, transparency, texture coordinate, etc. The vertex shader will generate for each vertex used to define and represent each primitive (polygon) of a scene a set of attributes (colour, transparency, texture coordinates, etc.). These generated attributes may be referred to generally as vertex shaded attribute data.

As part of the fragment shading process, the fragment shader usually interpolates vertex shaded attribute data so as to generate interpolated attribute data for a fragment's sampling point(s). This process of providing the interpolated attribute data may be referred to generally as a varying calculation and may, for example, be carried out in a varying pipeline of the fragment shader. The varying pipeline usually includes a varying interpolator that inputs the vertex shaded attribute data and x,y coordinates for the fragment (e.g. for the fragment's sampling point(s)) and outputs the interpolated attribute data.

FIG. 1 illustrates an approach to interpolating vertex shaded attribute data in which a triangular primitive 5 is being sampled using a "quad" 10 of four fragments 6,7,8,9, with each of the fragments 6,7,8,9 having a central sample point. In this example, the x,y coordinates for each of the sampling points are directly used by a varying interpolator to evaluate a varying plane equation for the primitive so as to provide interpolated attribute data ($S_0$, $S_1$, $S_2$, $S_3$) for those sampling points. However, evaluating the varying plane equation for each set of x,y coordinates directly in this way can be computationally expensive.

FIG. 2 illustrates an alternative approach in which the x,y coordinates of just one of the sampling points of one of the fragments 6 are used directly to provide interpolated attribute data $S_0$ for that sampling point. Sampling point delta values $S_x$, $S_y$ are then used to provide interpolated attribute data $S_1$, $S_2$, $S_3$ for each of the other sampling points of the other fragments 7,8,9, for example in the following manner:

$$S_1 = S_0 + S_x$$

$$S_2 = S_0 + S_y$$

$$S_3 = S_0 + S_x + S_y$$

Using sampling point delta values in this way can be computationally less expensive than using the x,y coordinates for each of the sampling points directly since it is not necessary to fully evaluate the varying plane equation for the primitive at each of the sampling points using the x,y coordinates of that sampling point. However, this approach can still be inefficient since the number of add operations that involve the sampling point delta values is not consistent across all of the sampling points. In particular, there is only a single add operation to generate $S_1$ and $S_2$, but two add operations to generate $S_3$. This can mean, for example, that some adders which are used to perform the add operations may be left idle during some cycles of operation or a feedback loop may need to be included.

The Applicants believe that there remains scope for improvements to the operation of graphics processors that include a fragment shading stage that generates interpolated vertex attribute data.

BRIEF DESCRIPTION OF THE DRAWINGS

A number of embodiments of the technology described herein will now be described by way of example only and with reference to the accompanying drawings, in which:

FIG. 3 shows an example of a computer graphics processing system that can be operated in the manner of the technology described herein;

FIG. 4 shows schematically a graphics processing pipeline that can be operated in the manner of the technology described herein;

Like reference numerals are used for like components where appropriate in the drawings.

DETAILED DESCRIPTION

Figure 1:
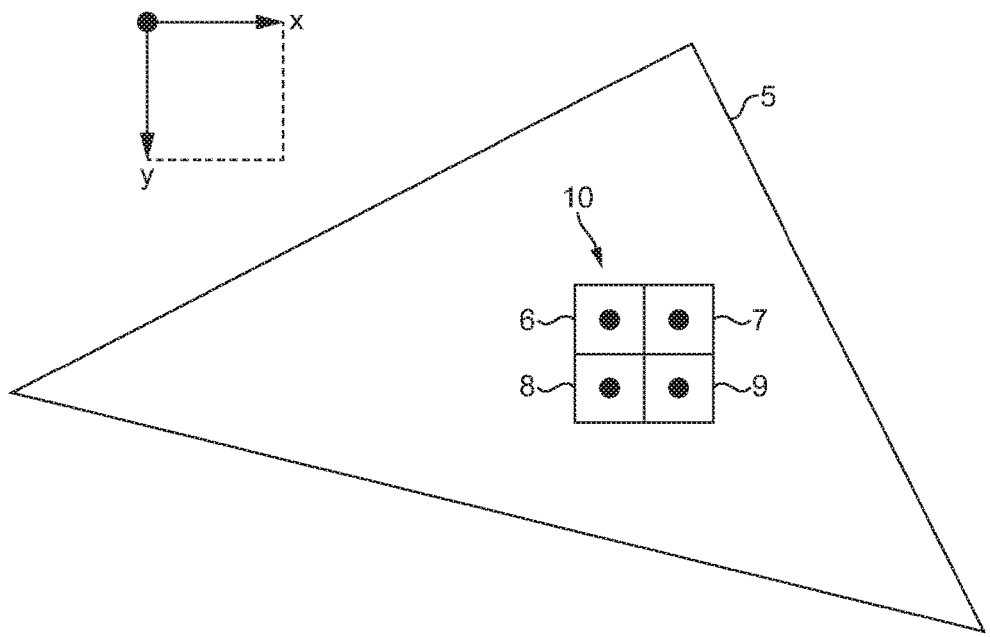
FIG. 1 illustrates an approach to sampling a primitive at plural sampling points.
Figure 2:
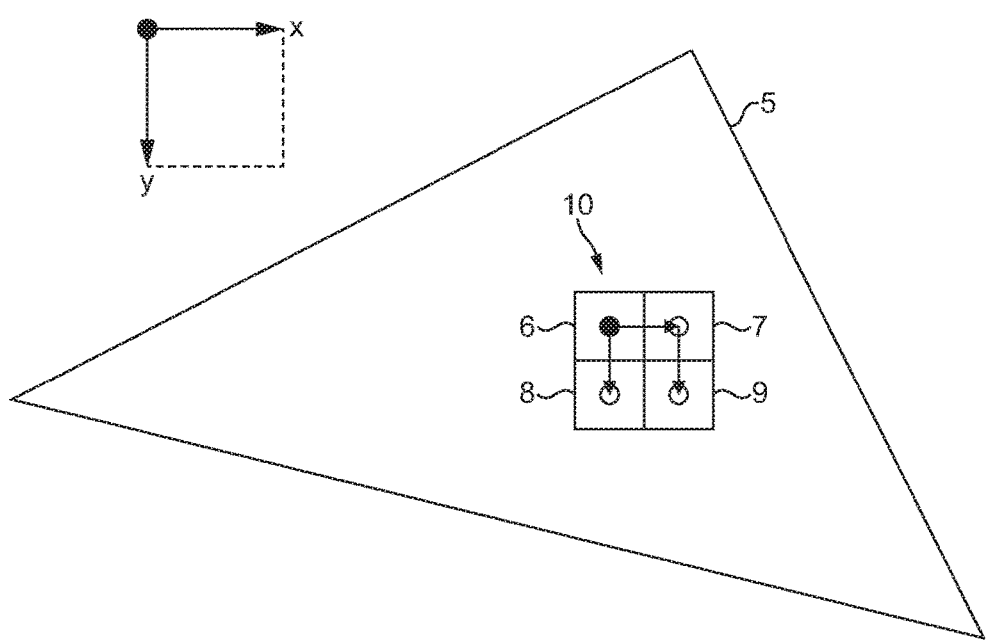
FIG. 2 illustrates an alternative approach to sampling a primitive at plural sampling points that uses sampling point delta values.

An embodiment of the technology described herein comprises a method of operating a graphics processing system that includes a fragment shading stage which processes vertex shaded attribute data for primitives so as to generate interpolated attribute data for sampling points, the method comprising:

generating sampling point delta values for a primitive; and generating interpolated attribute data for at least one sampling point of a group of plural sampling points which are being used to sample the primitive;

wherein the interpolated attribute data for the at least one sampling point is generated using a position of a reference point for the group of plural sampling points together with at least one of the sampling point delta values;

wherein the position of the reference point for the group of plural sampling points is defined with respect to a first coordinate system, and wherein the sampling point delta values for the primitive are defined with respect to a second coordinate system that is rotated relative to the first coordinate system.

Another embodiment of the technology described herein comprises a graphics processing system that includes a fragment shading stage which is configured to process vertex shaded attribute data for primitives so as to generate interpolated attribute data for sampling points, the system further comprising processing circuitry configured to:

generate sampling point delta values for a primitive; and generate interpolated attribute data for at least one sampling point of a group of plural sampling points which are being used to sample the primitive;

wherein the processing circuitry is configured to generate the interpolated attribute data for the at least one sampling point using a position of a reference point for the group of plural sampling points together with at least one of the sampling point delta values;

wherein the position of the reference point for the group of plural sampling points is defined with respect to a first coordinate system, and wherein the sampling point delta values for the primitive are defined with respect to a second coordinate system that is rotated relative to the first coordinate system.

In the technology described herein, the interpolated attribute data for a sampling point of a group of plural sampling points is generated using a position of a reference point for the group of plural sampling points together with at least one sampling point delta value. As discussed above, using sampling point delta values can be computationally less expensive than, for example, generating interpolated attribute data directly using the position of each of the sampling points. Furthermore, in the technology described herein, the sampling point delta values are defined with respect to a second coordinate system that is rotated relative to a first coordinate system used to define the position of the reference point. The Applicants have recognised that this can, for example, more evenly distribute the number of operations that need to be performed when using the sampling point delta values to generate the interpolated attribute data, particularly for many common sampling point patterns, such as Ordered 4×, Rotated 4×, Direct3D 8×, etc. The technology described herein thus provides a graphics processing system that allows interpolated attribute data to be generated more efficiently.

The first coordinate system may comprise a first pair of perpendicular axes, which may be referred to herein as the "x" and "y" axes. Coordinates of the first coordinate system may relate to output positions, e.g. display screen positions. Thus, the first coordinate system may be referred to as "screen space". For layered or 3-dimensional graphics processing, the first coordinate system may comprise a further axis that is perpendicular to the pair of perpendicular axes. The further axis may be referred to herein as the "z" or "depth" axis.

The second coordinate system may comprise a second pair of perpendicular axes, which may be referred to herein as the "xmy" and "xpy" axes. As discussed above, the second coordinate system is rotated relative to the first coordinate system. Thus, the second coordinate system may be referred to as "rotated screen space". As will be appreciated, the second pair of perpendicular axes of the second coordinate system is in an embodiment rotated relative to the first pair of perpendicular axes of the first coordinate system. For layered or 3-dimensional graphics processing, the second coordinate system may again comprise a further axis that is perpendicular to the second pair of perpendicular axes. The further axis may be shared with the first coordinate system and may again be referred to as the "z" or "depth" axis.

The second coordinate system is accordingly in an embodiment rotated relative to the first coordinate system within the plane defined by the first and/or second pair of perpendicular axes and/or about the origin of the first and/or second coordinate system and/or about the further axis that is perpendicular to the first and/or second pair of perpendicular axes (and in an embodiment no other axes). In embodiments, the second coordinate system is rotated by 45° (or multiples thereof) relative to the first coordinate system, although other rotations could be used, e.g. depending on the particular sampling point pattern of the group of plural sampling points being used to sample the primitive.

The reference point for the group of plural sampling points may be positioned at any desired and suitable location. However, in embodiments, the reference point is positioned at an integer location (e.g. an integer (x or y) coordinate, an integer number of fragments/pixels, etc.) along one or more of the axes of the first coordinate system. These embodiments can, for example, reduce the number of bits needed to represent the position of the reference point.

In embodiments, the reference point is positioned centrally with respect to the plural sampling points of the group of sampling points. In embodiments, at least some or all of the sampling points of the group of plural sampling points are equidistant from the reference point. The reference point is in an embodiment positioned such that a straight line from the reference point to at least one, some or all of the sampling points of the group of plural sampling points is parallel to one of the axes of the second coordinate system. The reference point is in an embodiment positioned such that at least one, some or all of the sampling points of the group of plural sampling points can be reached from the reference point by an integer number of unit steps along one or more of the axes of the second coordinate system. These embodiments can, for example, further simplify the operations that need to be performed when using sampling point delta values to generate interpolated attribute data.

The vertex shaded attribute data for the primitive may be generated by a vertex shading stage of the graphics processing system, e.g. in a conventional manner. Thus, the graphics processing system may comprise a vertex shading stage which processes input attribute data to generate vertex shaded attribute data for primitives for use by the fragment shading stage. The vertex shaded attribute data may be any desired and suitable such attribute data that a vertex shader may generate or operate on. This may include, for example, values of attributes such as vertex position, vertex colour, vertex transparency, vertex texture coordinates, etc. for the primitive.

In embodiments, the step of generating the interpolated attribute data takes place in an abstract parameter space for the primitive. The parameter space is in an embodiment a barycentric parameter space for the primitive.

As will be appreciated by those skilled in the art, the barycentric coordinates for a point within a barycentric parameter space for a primitive are generally given by i,j,k, where each of i,j,k indicates the weight for each vertex attribute (or distance to that vertex) for that point. The sum of i+j+k is generally normalised so as to equal 1. Thus, the value of k can be inferred using the values of i and j. Thus, in embodiments and in the following description, the value of k is not considered further.

The barycentric coordinates for a point within a barycentric parameter space for the primitive can be calculated in any desired and suitable way. However, in embodiments and in the following description, the barycentric coordinates for a point within a barycentric parameter space for the primitive are calculated from barycentric coefficients ($i_a$, $j_a$; $i_b$, $j_b$; $i_c$, $j_c$) for varying plane equations for the primitive. These varying plane equations in the non-rotated first coordinate system may take the form:

$$i(x,y)=i_a*x+i_b*y+i_c$$

$$j(x,y)=j_a*x+j_b*y+j_c$$

There may therefore be provided barycentric coefficients ($i_a$, $j_a$; $i_b$, $j_b$; $i_c$, $j_c$) for the primitive. The barycentric coefficients ($i_a$, $j_a$; $i_b$, $j_b$; $i_c$, $j_c$) may be generated during primitive (e.g. triangle) setup, e.g. using vertex position data output from a vertex shading stage. The primitive setup may be carried out by a primitive (e.g. triangle) setup stage of the graphics processing system, which may be before or form part of a rasterisation stage in the graphics processing pipeline.

As will be appreciated by those skilled in the art, the above barycentric coordinate are not perspective corrected. There may therefore also be provided a perspective correction value (w) for a point within the barycentric parameter space for the primitive, if desired.

The perspective correction value (w) for a point within a barycentric parameter space for the primitive can be calculated in any desired and suitable way. However, in embodiments, the perspective correction value (w) for a point within a barycentric parameter space for the primitive is calculated from perspective correction coefficients ($w_a$; $w_b$; $w_c$) for a varying plane equation for the primitive. This varying plane equation in the non-rotated first coordinate system may take the form:

$$w(x,y)=w_a*x+w_b*y+w_c$$

with the perspective corrected barycentric coordinates then being given by:

$$i(x,y)=i(x,y)/w(x,y)$$

$$j(x,y)=j(x,y)/w(x,y)$$

If desired, the perspective correction value (w) and/or perspective correction coefficients ($w_a$; $w_b$; $w_c$) may include a constant factor for the primitive that has the effect of normalising the barycentric coordinates when applying the perspective correction.

Again, the perspective correction coefficients ($w_a$; $w_b$; $w_c$) may be generated during primitive setup, e.g. using vertex position data output from a vertex shading stage.

The sampling point delta values ($S_{xpy}$; $S_{xmy}$) for the primitive in an embodiment each relate a change in a value to be interpolated when sampling the primitive (e.g. a colour value (RGB), a transparency value (alpha), a texture coordinate, a barycentric coordinate (i, j), a perspective correction value (w), etc.), in an embodiment with respect to a unit step along one of the axes (xmy, xpy) of the second coordinate system.

As discussed above, in embodiments, the step of generating the interpolated attribute data takes place in a barycentric parameter space. In these embodiments, the sampling point delta values may comprise (rotated) barycentric coefficients ($i_{apb}$, $j_{apb}$; $i_{amb}$, $j_{amb}$) defined with respect to the second coordinate system. As will be discussed in more detail below, the sampling point delta values may also comprise (rotated) perspective correction coefficients ($w_{apb}$; $w_{amb}$) defined with respect to the second coordinate system.

There is in an embodiment at least one sampling point delta value for each type of value to be interpolated, in an embodiment for each axis (xmy, xpy) of the second coordinate system along which interpolation of that value will take place. For example, where there are two barycentric coordinates (i, j) to be interpolated along two axes (xmy, xpy), there may be generated at least four sampling point delta values ($i_{apb}$, $j_{apb}$; $i_{amb}$, $j_{amb}$). Similarly, where there is one perspective correction value (w) to be interpolated along two axes (xmy, xpy), there may also be generated at least two further sampling point delta values ($w_{apb}$; $w_{amb}$).

The sampling point delta values may be generated in any desired and suitable manner. In some embodiments, generating the sampling point delta values may comprise generating (non-rotated) sampling point delta values ($S_x$; $S_y$) defined with respect to the first coordinate system. The (non-rotated) sampling point delta values defined with respect to the first coordinate system may then be rotated so as to generate the (rotated) sampling point delta values ($S_{xpy}$; $S_{xmy}$) defined with respect to the second coordinate system.

Generating the (rotated) sampling point delta values ($S_{xpy}$; $S_{xmy}$) defined with respect to the second coordinate system may comprise applying a rotation matrix to the (non-rotated)

sampling point delta values ($S_x$; $S_y$) defined with respect to the first coordinate system. For example, generating the sampling point delta values ($S_x$; $S_y$) may comprise applying a rotation matrix as follows:

$$\begin{bmatrix} Sxmy \\ Sxpy \end{bmatrix} = \begin{bmatrix} \cos\theta & -\sin\theta \\ \sin\theta & \cos\theta \end{bmatrix} \begin{bmatrix} Sx \\ Sy \end{bmatrix}$$

where θ is the (anticlockwise) angle of rotation. As will be appreciated, equivalent calculations may be performed to affect the desired rotation.

Generating the sampling point delta values ($S_{xpy}$; $S_{xmy}$) defined with respect to the second coordinate system may further comprise applying additional scaling (i.e. scaling in addition to any inherent scaling that occurs as a result of the (pure) rotation). This additional scaling may allow, for example, for simpler generation of the sampling point delta values. For example, as discussed above, in embodiments, the second coordinate system is rotated by 45° (or multiples thereof) relative to the first coordinate system. As will be appreciated, in these embodiments, the (non-rotated) sampling point delta values defined with respect to the first coordinate system may inherently be scaled by 1/√2 (i.e. cos 45° or sin 45° as a result of the rotation. In these embodiments, the additional scaling which may be applied may be a further multiplication by 1/√2. As will be appreciated, this leads to an overall scaling of ½ (i.e. 1/√2*1/√2) being applied to the (non-rotated) sampling point delta values defined with respect to the first coordinate system. The overall generation of the (rotated) sampling point delta value defined with respect to the second coordinate system can therefore be simplified, since it can comprise multiplying the sampling point delta values by ½, and this may be achieved merely using a bit shift.

As discussed above, in embodiments, the step of generating the interpolated attribute data takes place in a barycentric parameter space. In these embodiments, the (non-rotated) sampling point delta values ($S_x$; $S_y$) defined with respect to the first coordinate system may comprise (non-rotated) barycentric coefficients ($i_a$, $j_a$; $i_b$, $j_b$) defined with respect to the first coordinate system. Similarly, the (rotated) sampling point delta values ($S_{xpy}$; $S_{xmy}$) defined with respect to the second coordinate system may comprise (rotated) barycentric coefficients ($i_{apb}$, $j_{apb}$; $i_{amb}$, $j_{amb}$) defined with respect to the second coordinate system.

In these embodiments, generating the (rotated) sampling point delta values ($i_{apb}$, $j_{apb}$; $i_{amb}$, $j_{amb}$) defined with respect to the second coordinate system from the (non-rotated) sampling point delta values ($i_a$, $j_a$; $i_b$, $j_b$) defined with respect to the first coordinate system may be achieved as follows:

$$i_{apb} = \frac{i_a + i_b}{2}$$

$$i_{amb} = \frac{i_a - i_b}{2}$$

$$j_{apb} = \frac{j_a + j_b}{2}$$

$$j_{amb} = \frac{j_a - j_b}{2}$$

As will be appreciated, the above equations are equivalent to applying a rotation matrix as follows:

$$\begin{bmatrix} i_{amb}, j_{amb} \\ i_{apb}, j_{apb} \end{bmatrix} = \begin{bmatrix} \cos\theta & -\sin\theta \\ \sin\theta & \cos\theta \end{bmatrix} \begin{bmatrix} i_a, j_a \\ i_b, j_b \end{bmatrix}$$

where θ=45°, together with an additional scaling achieved by multiplication by 1/√2.

The sampling point delta values for the primitive may be generated by any desired and suitable stage of the graphics processing system. In embodiments, the sampling point delta values are generated, at least in part, during primitive setup, for example using vertex position data output from a vertex shading stage.

Thus, the graphics processing system may comprise a primitive setup stage which generates (rotated and/or non-rotated) sampling point delta values for primitives for use by the fragment shading stage, for example using vertex position data output from a vertex shading stage. As discussed above, the primitive setup stage may be before or form part of a rasterisation stage in the graphics processing pipeline. The graphics processing system may further comprise a vertex shading stage which generates the vertex position data for use by the primitive setup stage.

In embodiments, the primitive setup stage may generate (non-rotated) sampling point delta values defined with respect to the first coordinate system, for example in a manner as discussed above. The primitive setup stage may then rotate the (non-rotated) sampling point delta values defined with respect to the first coordinate system so as to generate the (rotated) sampling point delta values defined with respect to the second coordinate system for the primitive, for example in a manner as discussed above.

In alternative embodiments, the primitive setup stage may generate (non-rotated) sampling point delta values defined with respect to the first coordinate system, for example in a manner as discussed above. However, the fragment shading stage may then rotate the (non-rotated) sampling point delta values defined with respect to the first coordinate system so as to generate the (rotated) sampling point delta values defined with respect to the second coordinate system for the primitive, for example in a manner as discussed above.

The interpolated attribute data may be any desired and suitable such attribute data that a fragment shader may generate or operate on. This may include, for example, values of attributes such as a colour value (RGB), a transparency value (alpha), a texture coordinate, etc.

As discussed above, in the technology described herein the interpolated attribute data for the at least one sampling point of the group of plural sampling points is generated using the position of the reference point for the group of plural sampling points together with at least one of the sampling point delta values. This may be carried out in any desired and suitable way.

However, as discussed above, in embodiments, this is carried out using a barycentric parameter space for the primitive. In these embodiments, using the position of the reference point may comprise determining barycentric coordinates ($i_{centre}$, $j_{centre}$) for the reference point from the position of the reference point. In these embodiments, determining the barycentric coordinates ($i_{centre}$, $j_{centre}$) for the reference point may comprise rotating (non-rotated) position coordinates ($x_{centre}$, $y_{centre}$) of the reference point defined with respect to the first coordinate system so as to generate (rotated) position coordinates ($xpy_{centre}$, $xmy_{centre}$) for the reference point defined with respect to the second coordinate system.

Generating the (rotated) position coordinates ($xpy_{centre}$, $xmy_{centre}$) for the reference point defined with respect to the second coordinate system may comprise applying a rotation matrix to the (non-rotated) position coordinates ($x_{centre}$, $y_{centre}$) defined with respect to the first coordinate system. For example, generating the (rotated) position coordinates ($xpy_{centre}$, $xmy_{centre}$) for the reference point may comprise applying a rotation matrix as follows:

$$\begin{bmatrix} xmy \\ xpy \end{bmatrix} = \begin{bmatrix} \cos\theta & -\sin\theta \\ \sin\theta & \cos\theta \end{bmatrix} \begin{bmatrix} x \\ y \end{bmatrix}$$

where $\theta$ is the (anticlockwise) angle of rotation. As will be appreciated, equivalent calculations may be performed to affect the desired rotation.

Generating the (rotated) position coordinates ($xpy_{centre}$, $xmy_{centre}$) for the reference point defined with respect to the second coordinate system may also comprise applying additional scaling (i.e. scaling in addition to any inherent scaling that occurs as a result of the (pure) rotation). This additional scaling may allow, for example, for simpler generation of the position coordinates ($xpy_{centre}$, $xmy_{centre}$).

For example, as discussed above, in embodiments, the second coordinate system is rotated by 45° (or multiples thereof) relative to the first coordinate system. As will be appreciated, in these embodiments, the (non-rotated) position coordinates ($x_{centre}$, $y_{centre}$) defined with respect to the first coordinate system may inherently be scaled by $1/\sqrt{2}$ (i.e. $\cos 45°$ or $\sin 45°$ as a result of the rotation. In these embodiments, the additional scaling which may be applied may be a multiplication by $\sqrt{2}$. As will be appreciated, this leads to no overall scaling (i.e. $1/\sqrt{2}*\sqrt{2}=1$) being applied to the (non-rotated) position coordinates ($x_{centre}$, $y_{centre}$) defined with respect to the first coordinate system. The generation of the (rotated) position coordinates ($xpy_{centre}$, $xmy_{centre}$) defined with respect to the second coordinate system can therefore be simplified, since there is no need to carry out multiplication on the (non-rotated) position coordinates ($x_{centre}$, $y_{centre}$) defined with respect to the first coordinate system.

As will also be appreciated, the additional scaling (e.g. $\sqrt{2}$) applied when rotating the position coordinates is in an embodiment cancelled out by the additional scaling (e.g. $1/\sqrt{2}$) applied when rotating the sampling point delta values, such that there is no overall scaling of the interpolated attribute data. This is generally desired to avoid distortion in the interpolated attribute data. This absence of overall scaling can also be achieved by exchanging the additional scaling applied when rotating the position coordinates with the additional scaling applied when rotating the sampling point delta values. For example, the additional scaling applied when rotating the position coordinates may be $1/\sqrt{2}$, and the additional scaling applied when rotating the sampling point delta values may be $\sqrt{2}$.

The (rotated) position coordinates ($xpy_{centre}$, $xmy_{centre}$) for the reference point defined with respect to the second coordinate system may then be used to determine the barycentric coordinates ($i_{centre}$, $j_{centre}$) for the reference point.

In embodiments, the barycentric coordinates ($i_{centre}$, $j_{centre}$) for the reference point are determined using the (rotated) position coordinates ($xpy_{centre}$, $xmy_{centre}$) defined with respect to the second coordinate system together with the (rotated) sampling point delta values ($i_{apb}$, $j_{apb}$; $i_{amb}$, $j_{amb}$) defined with respect to the second coordinate system, for example using a varying plane equation in the following manner:

$$i_{centre}=[i_{apb}*xpy_{centre}]+[i_{amb}*xmy_{centre}]+i_c$$

$$j_{centre}=[j_{apb}*xpy_{centre}]+[j_{amb}*xmy_{centre}]+j_c$$

In embodiments, at least one of the sampling point delta values ($i_{apb}$, $j_{apb}$; $i_{amb}$, $j_{amb}$) may be added to or subtracted from the barycentric coordinates ($i_{centre}$, $j_{centre}$) for the reference point to generate barycentric coordinates ($i_0$, $j_0$; $i_1$, $j_1$; $i_2$, $j_2$; $i_3$, $j_3$) for the at least one sampling point of the group of plural sampling points, for example in the following manner:

$$[i_0, j_0]=[i_{centre}-i_{apb}, j_{centre}-j_{apb}]$$

$$[i_1, j_1]=[i_{centre}+i_{amb}, j_{centre}+j_{amb}]$$

$$[i_2, j_2]=[i_{centre}-i_{amb}, j_{centre}-j_{amb}]$$

$$[i_3, j_3]=[i_{centre}+i_{apb}, j_{centre}+j_{apb}]$$

As will be appreciated, the above barycentric coordinates are not perspective corrected. Thus, as will be discussed in more detail below, the above barycentric coordinates may at this stage be perspective corrected, if desired. Also at this stage, the barycentric coordinates may be normalised, for example by dividing the barycentric coordinates by a constant for the primitive or when applying perspective correction to the barycentric coordinates.

Thus, as discussed above, in embodiments, the sampling point delta values ($i_{apb}$, $j_{apb}$; $i_{amb}$, $j_{amb}$) relate to changes in barycentric position (e.g. changes in the barycentric coordinates (i, j)) for the primitive, in an embodiment with respect to unit steps along the axes (xmy; xpy) of the second coordinate system.

Accordingly, using the position of the reference point for the group of plural sampling points together with at least one of the sampling point delta values may comprise processing the reference point for the group of plural sampling points so as to generate barycentric coordinates for the reference point, and then combining the barycentric coordinates for the reference point and at least one of the sampling point delta values so as to generate barycentric coordinates for the at least one sampling point of the group of plural sampling points.

Similarly, the fragment shading stage may comprise processing circuitry (e.g. a (barycentric evaluator of a) varying interpolator) configured to process the reference point for the group of plural sampling points so as to generate barycentric coordinates for the reference point, and then combine the barycentric coordinates for the reference point and at least one of the sampling point delta values so as to generate barycentric coordinates for the at least one sampling point of the group of plural sampling points.

The barycentric coordinates for the at least one sampling point ($i_0$, $j_0$; $i_1$, $j_1$; $i_2$, $j_2$; $i_3$, $j_3$) of the group of plural sampling points may then be used to derive interpolated attribute data ($S_0$, $S_1$, $S_2$, $S_3$) for the at least one sampling point.

Deriving the interpolated attribute data ($S_0$, $S_1$, $S_2$, $S_3$) for the at least one sampling point may comprise interpolation using the barycentric coordinates ($i_0$, $j_0$; $i_1$, $j_1$; $i_2$, $j_2$; $i_3$, $j_3$) for the at least one sampling point. The interpolation may comprise multiplying each barycentric coordinate ($i_0$, $j_0$; $i_1$, $j_1$; $i_2$, $j_2$; $i_3$, $j_3$) for the at least one sampling point by a corresponding vertex shaded attribute value ($S_i$, $S_j$, $S_k$, e.g. colour value, transparency value, texture coordinate, etc.) for the vertex to which that barycentric coordinate relates, and then summing the results of the multiplications, for example in the following manner:

$$S_0=[S_i*i_0]+[S_j*j_0]+[S_k*(1-i_0-j_0)]$$

$$S_1=[S_i*i_1]+[S_j*j_1]+[S_k*(1-i_1-j_1)]$$

$$S_2=[S_i*i_2]+[S_j*j_2]+[S_k*(1-i_2-j_2)]$$

$$S_3=[S_i*i_3]+[S_j*j_3]+[S_k*(1-i_3-j_3)]$$

The above may be generalised as:

$$S_n=[S_i\times i_n]+[S_j\times j_n]+[S_k\times(1-i_n-j_n)], \text{ where } n \text{ is the sampling point number } (e.g.\ 0, 1, 2, 3).$$

The above may be rewritten as:

$$S_n=[S_i-S_k]*i_n+[S_j-S_k]*j_n+S_k$$

or:

$$S_n=S_{i\_new}*i_n+S_{j\_new}*j_nS_k, \text{ where } S_{i\_new}=S_i-S_k \text{ and } S_{j\_new}=S_j-S_k.$$

In embodiments, the above form of the interpolation equation is used when deriving the interpolated attribute data for the at least one sampling point. This allows, for example, for "modified" vertex shaded attribute values ($S_{i\_new}$, $S_{j\_new}$, $S_k$) for the vertices of the primitive to be calculated from the "unmodified" vertex shaded attribute values ($S_i$, $S_j$, $S_k$) for the vertices of the primitive in advance, i.e. prior to deriving the interpolated attribute data for the at least one sampling point. The modified vertex shaded attribute values ($S_{i\_new}$, $S_{j\_new}$, $S_k$) for the vertices of the primitive can then, for example, be reused when deriving the interpolated attribute data for other sampling points. This can, for example, reduce the processing burden when deriving the interpolated attribute data by avoiding the need to carry out the same calculations multiple times for plural sampling points.

Thus, in embodiments, modified vertex shaded attribute values ($S_{i\_new}$, $S_{j\_new}$, $S_k$) for the vertices of the primitive are calculated from vertex shaded attribute values ($S_i$, $S_j$, $S_k$) for the vertices of the primitive. The modified vertex shaded attribute values ($S_{i\_new}$, $S_{j\_new}$, $S_k$) for the vertices of the primitive are in an embodiment calculated from the vertex shaded attribute values ($S_i$, $S_j$, $S_k$) for the vertices of the primitive in the following way:

$$S_{i\_new}=S_i-S_k$$

$$S_{j\_new}=S_j-S_k$$

$$S_k=S_k$$

The modified vertex shaded attribute values ($S_{i\_new}$, $S_{j\_new}$, $S_k$) for the vertices of the primitive may then be stored, e.g. in an attribute cache, ready for use when deriving interpolated attribute data for the at least one sampling point.

Accordingly, as described above, using the position of the reference point for the group of plural sampling points together with at least one of the sampling point delta values may comprise processing barycentric coordinates for the at least one sampling point of the group of plural sampling points so as to generate the interpolated attribute data for the at least one sampling point of the group of plural sampling points.

Similarly, the fragment shading stage may comprise processing circuitry (e.g. a (attribute evaluator of a) varying interpolator) configured to process the barycentric coordinates for the at least one sampling point of the group of plural sampling points so as to generate the interpolated attribute data for the at least one sampling point of the group of plural sampling points.

In alternative embodiments, the barycentric coordinates ($i_{centre}$, $j_{centre}$) for the position of the reference point may instead be used to derive reference interpolated attribute data ($S_{centre}$) for the reference point. Deriving the reference interpolated attribute data ($S_{centre}$) for the reference point may comprise interpolation using the barycentric coordinates ($i_{centre}$, $j_{centre}$) for the at least one sampling point. The interpolation may comprise multiplying each barycentric coordinate ($i_{centre}$, $j_{centre}$) for the reference point by a corresponding vertex shaded attribute value ($S_i$, $S_j$, $S_k$ e.g. colour value, transparency value, texture coordinate, etc.) for the vertex to which that barycentric coordinate relates, and then summing the results of the multiplications, for example in the following manner:

$$S_{centre}=[S_i*i_{centre}]+[S_j*j_{centre}]+[S_k*(1-i_{centre}-j_{centre})]$$

At least one of the sampling point delta values ($S_{xpy}$; $S_{xmy}$) may then be added to or subtracted from the reference interpolated attribute display data to generate interpolated attribute data ($S_0$, $S_1$, $S_2$, $S_3$) for the at least one sampling point of the group of plural sampling points, for example in the following manner:

$$S_0=S_{centre}-S_{xpy}$$

$$S_1=S_{centre}+S_{xmy}$$

$$S_2=S_{centre}-S_{xmy}$$

$$S_3=S_{centre}+S_{xpy}$$

In these alternative embodiments, the sampling point delta values ($S_{xpy}$; $S_{xmy}$) relate to changes in vertex shaded attribute data (e.g. colour, transparency, texture coordinates, etc.), in an embodiment with respect to unit steps along the axes of the second coordinate system, rather than changes in barycentric position.

Thus, in alternative embodiments, using the position of the reference point for the group of plural sampling points together with at least one of the sampling point delta values may comprise processing the reference point for the group of plural sampling points so as to generate reference interpolated attribute data for the reference point, and then combining the reference interpolated attribute data for the reference point and at least one of the sampling point delta values so as to generate the interpolated attribute data for the at least one sampling point of the group of plural sampling points.

Similarly, in alternative embodiments, the fragment shading stage may comprise processing circuitry (e.g. a (combined barycentric and attribute evaluator of a) varying interpolator) configured to process the reference point for the group of plural sampling points so as to generate reference interpolated attribute data for the reference point, and then combine the reference interpolated attribute data for the reference point and at least one of the sampling point delta values so as to generate the interpolated attribute data for the at least one sampling point of the group of plural sampling points.

It should be noted that the above alternative embodiments would not produce a perspective corrected result. However, the above alternative embodiments may still be useful, for example, for 2D graphics and/or blitting.

In other embodiments, generating the interpolated attribute data for the at least one sampling point may further comprise applying perspective correction.

As discussed above, in embodiments, the step of generating the interpolated attribute data takes place in a barycentric parameter space. In these embodiments, applying perspective correction may comprise applying scaling to the barycentric coordinates for the at least one sampling point using a perspective correction value ($w_0$; $w_1$; $w_2$; $w_3$) for the at least one sampling point, for example prior to using those barycentric coordinates to derive the interpolated attribute data.

The perspective correction value ($w_0$; $w_1$; $w_2$; $w_3$) for the at least one sampling point may be generated in a similar manner to the barycentric coordinates for the at least one sampling point, e.g. using the position ($x_{centre}$, $y_{centre}$) of the reference point for the group of plural sampling points together with at least one further sampling point delta value. These further sampling point delta values may be the above mentioned (rotated) perspective correction coefficients ($w_{apb}$; $w_{amb}$).

The perspective correction coefficients ($w_{apb}$; $w_{amb}$) may be defined with respect to the second coordinate system and may generated in a similar manner to the other sample point delta values discussed above. For example, generating the perspective correction coefficients ($w_{apb}$; $w_{amb}$) may comprise generating (non-rotated) perspective correction coefficients ($w_a$; $w_b$) defined with respect to the first coordinate system. The (non-rotated) perspective correction coefficients ($w_a$; $w_b$) defined with respect to the first coordinate system may then be rotated so as to generate (rotated) perspective correction coefficients ($w_{apb}$; $w_{amb}$) defined with respect to the second coordinate system, for example in the following way:

$$w_{apb} = \frac{w_a + w_b}{2}$$

$$w_{amb} = \frac{w_a - w_b}{2}$$

As will be appreciated, the above equations are equivalent to applying a rotation matrix as follows:

$$\begin{bmatrix} w_{amb} \\ w_{apb} \end{bmatrix} = \begin{bmatrix} \cos\theta & -\sin\theta \\ \sin\theta & \cos\theta \end{bmatrix} \begin{bmatrix} w_a \\ w_b \end{bmatrix}$$

where $\theta = 45°$, together with an additional scaling achieved by multiplication by $1/\sqrt{2}$.

Generating the (non rotated and/or rotated) perspective correction coefficients may again be carried out, at least in part, during primitive setup, e.g. using vertex position data output from a vertex shading stage, or may be carried out, at least in part, by the fragment shading stage.

Using the position ($x_{centre}$, $y_{centre}$) of the reference point for the group of plural sampling points together with at least one perspective correction coefficient ($w_{apb}$; $w_{amb}$) may also be carried out in a similar manner to using the position ($x_{centre}$, $y_{centre}$) of the reference point for the group of plural sampling points together with the other sampling point delta values discussed above. For example, using the position ($x_{centre}$, $y_{centre}$) of the reference point may comprise determining a perspective correction value ($w_{centre}$) for the reference point.

In these embodiments, determining the perspective correction value ($w_{centre}$) for the reference point may comprise rotating the (non-rotated) position ($x_{centre}$, $y_{centre}$) of the reference point defined with respect to the first coordinate system so as to generate a (rotated) position ($xpy_{centre}$, $xmy_{centre}$) for the reference point defined with respect to the second coordinate system, for example in a manner as discussed above. The (rotated) position ($xpy_{centre}$, $xmy_{centre}$) for the reference point defined with respect to the second coordinate system may then be used to determine the perspective correction value ($w_{centre}$) for the reference point.

In embodiments the perspective correction value ($w_{centre}$) for the reference point is determined using the (rotated) position coordinates ($xpy_{centre}$, $xmy_{centre}$) together with the (rotated) perspective correction coefficients ($w_{apb}$; $w_{amb}$), for example using a plane equation in the following manner:

$$w_{centre} = [w_{apb} * xpy_{centre}] + [w_{amb} * xmy_{centre}] + w_c$$

At least one of the (rotated) perspective correction coefficients ($w_{apb}$; $w_{amb}$) may then be added to or subtracted from the perspective correction value ($w_{centre}$) for the reference point to generate the perspective correction value ($w_0$; $w_1$; $w_2$; $w_3$) for the at least one sampling point of the group of plural sampling points, for example in the following manner:

$$w_0 = w_{centre} - w_{apb}$$

$$w_1 = w_{centre} + w_{amb}$$

$$w_2 = w_{centre} - w_{amb}$$

$$w_3 = w_{centre} + w_{apb}$$

Applying scaling to the barycentric coordinates for the at least one sampling point may then comprise dividing the barycentric coordinates for the at least one sampling point by the perspective correction value ($w_0$; $w_1$; $w_2$; $w_3$) for the at least one sampling point, for example in the following manner:

$$[i_0, j_0] = [i_0/w_0, j_0/w_0]$$

$$[i_1, j_1] = [i_1/w_1, j_1/w_1]$$

$$[i_2, j_2] = [i_2/w_2, j_2/w_2]$$

$$[i_3, j_3] = [i_3/w_3, j_3/w_3]$$

The above may be generalised as:

$[i_n, j_n] = [i_n/w_n, j_n/w_n]$, where $n$ is the sampling point number (e.g. 0, 1, 2, 3).

Accordingly, applying perspective correction may comprise processing the reference point for the group of plural sampling points to generate a perspective correction value for the reference point, and then combining the perspective correction value for the reference point and at least one perspective correction coefficient so as to generate a perspective correction value for the at least one sampling point of the group of plural sampling points, and then scaling barycentric coordinates for the at least one sampling point using the perspective correction value for the at least one sampling point of the group of plural sampling points.

Similarly, the fragment shading stage may comprise processing circuitry (e.g. a (barycentric evaluator of a) varying interpolator) configured to process the reference point for the group of plural sampling points to generate a perspective correction value for the reference point, and then combine the perspective correction value for the reference point and at least one perspective correction coefficient so as to generate a perspective correction value for the at least one sampling point of the group of plural sampling points, and then scale barycentric coordinates for the at least one sampling point using the perspective correction value for the at least one sampling point of the group of plural sampling points.

The group of plural sampling points may comprise or consist of any desired and suitable number of sampling points. In embodiments, the group of plural sampling points comprises or consists of $2^n$ sampling points, where n is an integer and may be, for example, 2, 3, 4, etc. The group of plural sampling points may also have any desired and suitable pattern. The pattern is in an embodiment (e.g. rotationally) symmetric and/or may be ordered or rotated. In embodiments, the pattern is Ordered 4×, Rotated 4×, Direct3D 8×, etc.

The group of plural sampling points may be the sampling points of a (single) fragment, e.g. a super sampled fragment, or may be the sample points of plural fragments, e.g. a "quad" fragment. The plural fragments may each comprise a (single) sampling point of the group of sampling points, or may each comprise plural sampling points of the group of sampling points, e.g. the plural fragments may each be super sampled.

The interpolated attribute data generated for the at least one sampling point may be used as desired. For example, the interpolated attribute data may be used when rendering the primitive to generate output (e.g. graphics) data values, e.g. for display. Thus, the technology described herein in an embodiment further comprises using the interpolated attribute data generated for the at least one sampling point to render the primitive to which the interpolated attribute data relates so as to generate output (e.g. graphics) data values, e.g. for display.

It will be appreciated that as a primitive may be sampled using plural (e.g. some or all of the) sampling points of the group of plural sampling points covered by the primitive, in practice the method of the technology described herein may be carried out in respect of plural (e.g. each and/or every) sampling point of the group of plural sampling points that is needed to sample the primitive, so that eventually an appropriate set of interpolated attribute data has been generated for each sampling point of the group that is needed to sample the primitive.

It will also be appreciated that as a primitive will typically be sampled using plural groups (e.g. plural fragments or plural groups of fragments) of plural sampling points covered by the primitive, in practice the method of the technology described herein may be carried out in respect of plural groups of plural sampling points that are needed to sample the primitive, so that eventually an appropriate set of interpolated attribute data has been generated for each sampling point of each of the plural groups of plural sampling points that are needed to sample the primitive.

The technology described herein also extends to a method or apparatus for rendering primitives to generate output (e.g. graphics) data values, e.g. for display, that uses the interpolated attribute data for sampling points covered by the primitives and then further renders the primitives using the interpolated attribute data. The further rendering process may, for example, include texture sampling, blending, etc., using the interpolated attribute data.

It will be appreciated that as an output to be rendered by the graphics processing pipeline will typically be made up of plural primitives (and tiles in a tile-based system), in practice the method of the technology described herein will be repeated for each primitive (and tile) making up the output, so that eventually an appropriate set of interpolated attribute data has been generated for each sampling point of the output that is needed for the output.

As will be appreciated by those skilled in the art, the graphics processing unit of the technology described herein will be part of an overall graphics processing system that will include, e.g., a host processor that, e.g., executes applications that require graphics processing by the graphics processing unit. The host processor will send appropriate commands and data to the graphics processing unit to control it to perform graphics processing operations and to produce graphics processing (render) output required by applications executing on the host processor. To facilitate this, the host processor should, and in an embodiment does, also execute a driver for the graphics processing unit and a compiler or compilers for compiling shader programs to be executed by the programmable execution unit of the graphics processing unit.

The graphics processing unit may also comprise, and/or be in communication with, one or more memories and/or memory devices that store the data described herein, and/or the output data generated by the graphics processing unit, and/or store software for performing the processes described herein. The graphics processing unit may also be in communication with a host microprocessor, and/or with a display for displaying images based on the data generated by the graphics processing unit.

As well as the processing stages discussed above, the graphics processing unit and pipeline may also contain any other suitable and desired processing stages that a graphics processing pipeline may contain such as an early depth (or an early depth and stencil) tester, a late depth (or depth and stencil) tester, a tile or frame buffer, a write out unit, etc.

The technology described herein can be used for all forms of output that a graphics processing pipeline may be used to generate, such as frames for display, render-to-texture outputs, etc. The output, e.g. fragment shaded, data values from the graphics processing are in an embodiment exported to external, e.g. main, memory, for storage and use, such as to a frame buffer for a display.

The technology described herein is applicable to any suitable form or configuration of graphics processor. It is particularly, although not exclusively, applicable to tile-based graphics processors and graphics processing systems. Thus in an embodiment, the graphics processing system and graphics processing unit are a tile-based system and unit, respectively.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Thus, for example, the fragment shading stage may comprise plural separate fragment shaders, operating in parallel. Equally, the various processing stages may share processing circuitry, etc., if desired.

Subject to any hardware necessary to carry out the specific functions discussed above, the data processing system and pipeline can otherwise include any one or more or all of the usual functional units, etc., that data processing pipelines include.

The vertex shader, fragment shader, and any other graphics processing stages can accordingly be implemented as desired and in any suitable manner, and can perform any desired and suitable vertex shading, or fragment shading, etc., functions, respectively. Similarly, the various data (vertex shaded attribute data, barycentric coefficients, barycentric coordinates, sampling point delta values, interpolated attribute data, etc.) can be defined and stored in any suitable and desired manner.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said graphics processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further broad embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

FIG. 3 shows a typical computer graphics processing system. An application 2, such as a game, executing on a host processor 1 will require graphics processing operations to be performed by an associated graphics pipeline that is implemented by way of a graphics processing unit (GPU) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 4 shows the graphics processing pipeline 3 in more detail. The graphics processing pipeline 3 shown in FIG. 4 is a tile-based renderer and will thus produce tiles of a render output data array, such as an output frame to be generated. In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

The render output data array may typically be an output frame intended for display on a display device, such as a screen or printer, but may also, for example, comprise intermediate data intended for use in later rendering passes (also referred to as a "render to texture" output), etc.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 4 shows the main elements and pipeline stages of the graphics processing pipeline 3 that are relevant to the operation of the present embodiments. As will be appreciated by those skilled in the art there may be other elements of the graphics processing pipeline that are not illustrated in FIG. 4. It should also be noted here that FIG. 4 is only schematic, and that, for example, in practice the shown functional units and pipeline stages may share significant hardware circuits, even though they are shown schematically as separate stages in FIG. 4. It will also be appreciated that each of the stages, elements and units, etc., of the graphics processing pipeline as shown in FIG. 4 may be implemented as desired and will accordingly comprise, e.g., appropriate circuitry and/or processing logic, etc., for performing the necessary operation and functions.

As shown in FIG. 4, the graphics processing pipeline 3 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding vertex shaded attribute data values for use by subsequent stages of the graphics processing pipeline 3. The vertex shading, for example, modifies the input data to take account of the effect of lighting in the image to be rendered.

The hull shader 21 performs operations on sets of patch control points and generates additional data referred to as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 3.

The rasterisation stage 25 of the graphics processing pipeline 3 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader). As will be discussed in more detail below, this fragment processing includes processing vertex shaded attribute data to generate interpolated attribute data.

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30 if required. The tile buffer stores colour and depth buffers that store an appropriate colour, etc., or Z-value, respectively, for each sampling point that the buffers represent (in essence for each sampling point of a tile that is being processed). These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used). The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). The display device could comprise, e.g., a display comprising an array of pixels, such as a computer monitor or a printer.

The downsampling and writeout unit 31 downsamples the fragment data stored in the tile buffer 30 to the appropriate resolution for the output buffer (device) (i.e. such that an array of pixel data corresponding to the pixels of the output device is generated), to generate output data values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 including non tile-based pipelines would, of course, be possible.

As can be seen from FIG. 4, the graphics processing pipeline 3 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application. To do this, the application 2 provides the shader programs implemented using a high-level shader programming language, such as GLSL, HLSL, OpenCL, etc. These shader programs are then translated by a shader language compiler to binary code for the target graphics processing pipeline 3. This may include the creation of one or more intermediate representations of the program within the compiler. The compiler may, e.g., be part of the driver 4, with there being a special API call to cause the compiler to run. The compiler execution can thus be seen as being part of the draw call preparation done by the driver in response to API calls generated by an application.

Figure 5:
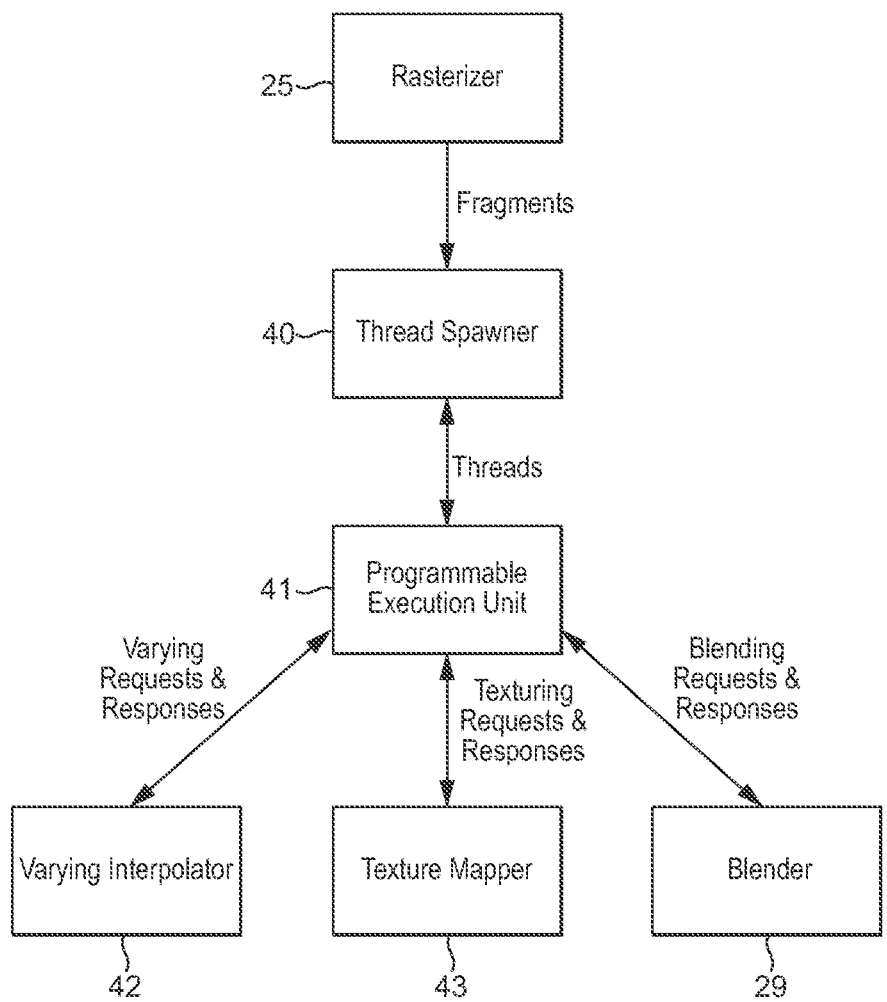
FIG. 5 shows schematically a graphics processing unit that can be operated in the manner of the technology described herein.

FIG. 4 shows schematically the operation stages of the graphics processing unit 3. FIG. 5 shows the corresponding functional units of the graphics processing unit 3 that are used to perform (and thus to act as) various ones of the processing operations and stages of the graphics processing pipeline shown in FIG. 4 and that are relevant to the technology described herein. There may be other functional units in the graphics processing unit 3, but FIG. 5 shows those functional units that are more relevant to operation in the manner of the technology described herein for simplicity.

As shown in FIG. 5, the graphics processing unit 3 includes a rasteriser 25, a thread spawner 40, a programmable execution unit 41, a varying interpolator 42, a texture mapper 43, and a blender 29.

The thread spawner 40 is operable to spawn execution threads for execution by the programmable execution unit 41 for fragments that it receives.

The programmable execution unit 41 operates to execute shader programs to perform the shader operations of the graphics processing pipeline, such as the hull shader, the vertex shader and the fragment shader. To do this, it receives execution threads from the thread spawner 40 and executes the relevant shader program for those execution threads.

The varying interpolator 42 operates to interpolate vertex attribute data across graphics primitives, and, as part of this operation, often creates texture coordinates to be used for sampling graphics textures.

The texture mapper 43 operates to sample graphics textures using texture coordinates, e.g. generated by the varying interpolator 42, and produces therefrom a filtered texture sample result.

The blender 29 operates to blend, e.g., fragment shading results generated by the programmable execution unit with previously generated fragment shader results, such as results that are already stored in the tile buffer.

Operation of the varying interpolator 42 in one embodiment will now be described in detail with reference to FIGS. 6 and 7.

Figure 6:
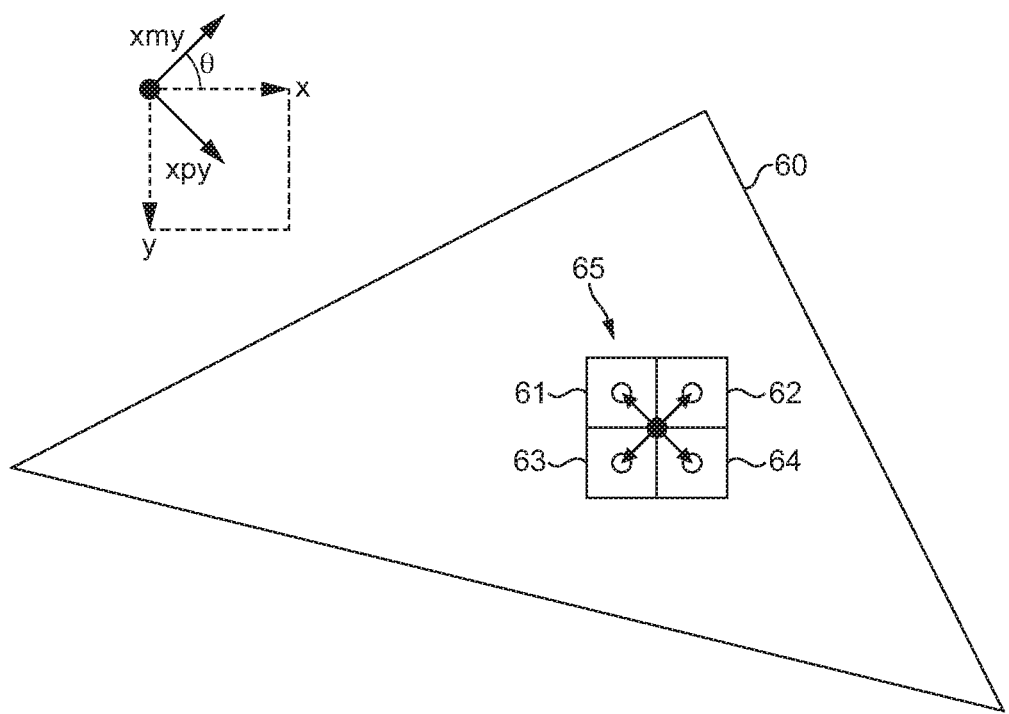
FIG. 6 illustrates a method of generating interpolated attribute data that is in accordance with the technology described herein.

As shown in FIG. 6, in this embodiment, a triangular primitive 60 is being sampled using a "quad" 65 of four fragments 61,62,63,64, with each of the fragments 61,62, 63,64 having a central sampling point.

A position $x_{centre}$, $y_{centre}$ of a central reference point for the quad 65 is defined with respect to a first coordinate system x,y. As will be discussed in more detail below, sampling point delta values which are defined with respect to a second coordinate system xmy, xpy are also generated for the primitive 60. The second coordinate system is rotated relative to the first coordinate system by an angle θ. In this embodiment, θ is 45°.

As will be discussed in more detail below with reference to FIG. 7, the varying interpolator 42 generates interpolated attribute data for the sampling points of the four fragments 61,62,63,64 using the position $x_{centre}$, $y_{centre}$ of the central reference point defined with respect to a first coordinate system together with at least one of the sampling point delta values defined with respect to a second coordinate system.

Figure 7:
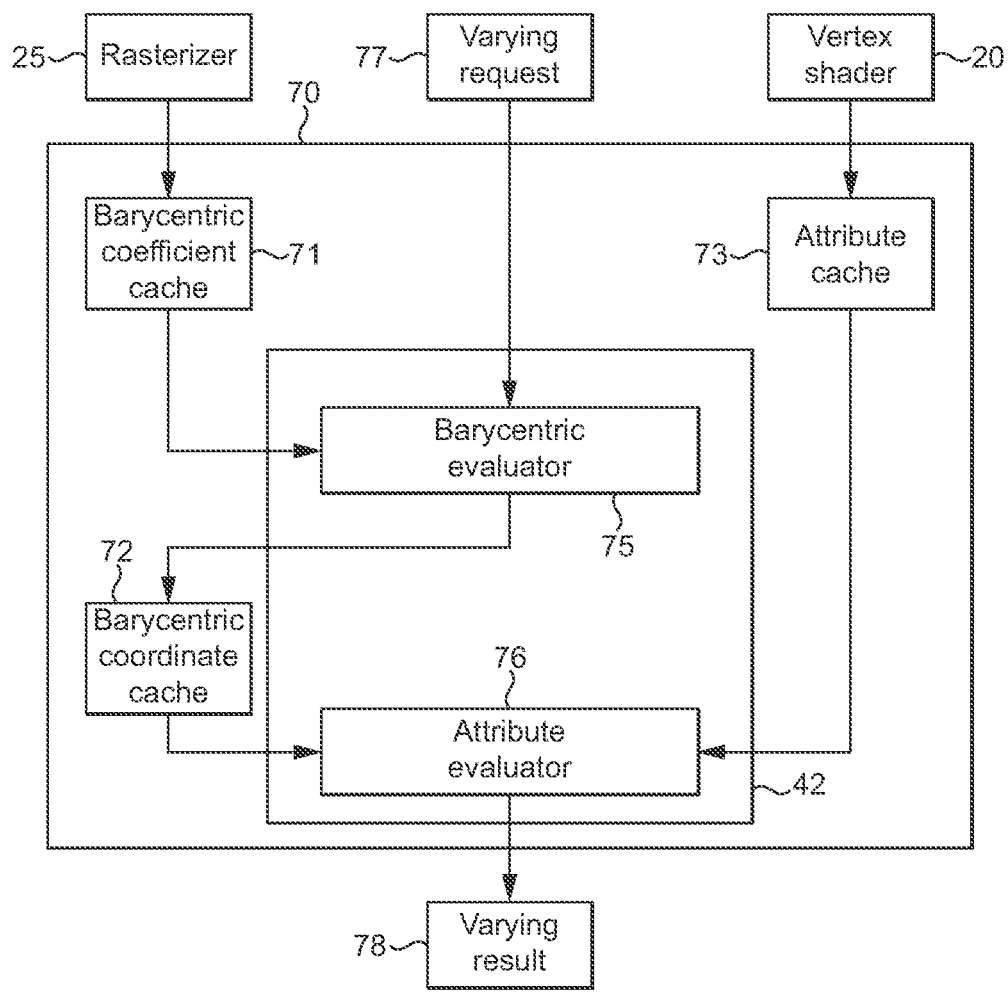
FIG. 7 shows schematically a varying pipeline and varying interpolator that can be operated in the manner of the technology described herein.

FIG. 7 shows schematically the functional units of a varying pipeline 70 used to interpolate vertex shaded attribute data that are relevant to the present embodiment. There may be other functional units in the varying pipeline 70, but FIG. 7 shows those functional units that are more relevant to operation in the manner of the technology described herein for simplicity.

As is shown in FIG. 7, the varying interpolator 42 of FIG. 5 forms part of the varying pipeline 70. The varying pipeline 70 also uses a barycentric coefficient cache 71 to store barycentric coefficients, a barycentric coordinate cache 72 to store barycentric coordinates, and an attribute cache 73 to store vertex shaded attribute data.

The varying pipeline 70 receives rotated barycentric coefficients ($i_{apb}$, $j_{apb}$; $i_{amb}$, $j_{amb}$) and rotated perspective correction coefficients ($w_{apb}$; $w_{amb}$) for the primitive 60 from the rasteriser 25 and stores them in the barycentric coefficient cache 71. In this embodiment, the rotated barycentric coefficients ($i_{apb}$, $j_{apb}$; $i_{amb}$, $j_{amb}$) and rotated perspective correction coefficients ($w_{apb}$; $w_{amb}$) can be thought of as being sampling point delta values ($S_{xpy}$; $S_{xmy}$).

The rotated barycentric coefficients ($j_{apb}$, $j_{apb}$; $j_{amb}$, $j_{amb}$) and perspective correction coefficients ($w_{apb}$; $w_{amb}$) are generated, during primitive setup, from non rotated barycentric coefficients ($i_a$, $j_a$; $i_b$, $j_b$) and perspective correction coefficients ($w_a$; $w_b$). The non rotated barycentric coefficients ($i_a$, $j_a$; $i_b$, $j_b$) and perspective correction coefficients ($w_a$; $w_b$) are generated, during primitive setup, in a conventional manner and are then rotated so as to provide the rotated barycentric coefficients ($i_{apb}$, $j_{apb}$; $i_{amb}$, $j_{amb}$) and perspective correction coefficients ($w_{apb}$; $w_{amb}$) in the following way:

$$i_{apb} = \frac{i_a + i_b}{2}$$

$$i_{amb} = \frac{i_a - i_b}{2}$$

$$j_{apb} = \frac{j_a + j_b}{2}$$

$$j_{amb} = \frac{j_a - j_b}{2}$$

$$w_{apb} = \frac{w_a + w_b}{2}$$

$$w_{amb} = \frac{w_a - w_b}{2}$$

As will be appreciated, the above equations are equivalent to applying a rotation matrix as follows:

$$\begin{bmatrix} i_{amb}, j_{amb}, w_{amb} \\ i_{apb}, j_{apb}, w_{apb} \end{bmatrix} = \begin{bmatrix} \cos\theta & -\sin\theta \\ \sin\theta & \cos\theta \end{bmatrix} \begin{bmatrix} i_a, j_a, w_a \\ i_b, j_b, w_b \end{bmatrix}$$

where θ=45°, together with an additional scaling achieved by multiplication by 1/√2. This additional scaling means that each rotated barycentric coefficient ($i_{apb}$, $j_{apb}$; $i_{amb}$, $j_{amb}$) and perspective correction coefficient ($w_{apb}$; $w_{amb}$) can be calculated by a single addition or subtraction and a bit shift to divide by 2.

The varying pipeline 70 also receives non-rotated barycentric coefficients ($i_c$, $j_c$) and a non-rotated perspective correction coefficient (wc) for the primitive 60 from the rasteriser 25 and stores these in the barycentric coefficient cache 71.

The varying pipeline 70 also receives vertex shaded attribute data from the vertex shader 20. The vertex shaded attribute data is generated by the vertex shader 20 in a conventional manner and includes vertex colours, vertex transparencies, vertex texture coordinates, etc. for the primitive 60. The varying pipeline 70 may convert and/or prepare the vertex shaded attribute data prior to storing the vertex shaded attribute data for the primitive 60 in the attribute cache 73.

The varying interpolator 42 operates in response to receiving a varying request message 77 from the programmable execution unit 41. The varying request message 77 includes the position $x_{centre}$, $y_{centre}$ of the reference point for the quad 65, which represents the sampling points for which vertex shaded attribute data is to be interpolated.

In this embodiment, the varying interpolator 42 comprises a barycentric evaluator 75 and an attribute evaluator 76.

The barycentric evaluator 75 receives the varying request message 77, then accesses the barycentric coefficients ($i_{apb}$, $j_{apb}$; $i_{amb}$, $j_{amb}$; $i_c$, $j_c$) and perspective correction coefficients ($w_{apb}$; $w_{amb}$, $w_c$) for the primitive 60 stored in the barycentric coefficient cache 71, and then generates barycentric coordinates ($i_0$, $j_0$; $i_1$, $j_1$; $i_2$, $j_2$; $i_3$, $j_3$) for each of the sampling points of the quad 65 in the following manner.

First, the position $x_{centre}$, $y_{centre}$ of the reference point is used to determine barycentric coordinates $i_{centre}$, $j_{centre}$ for the reference point. This comprises rotating the position $x_{centre}$, $y_{centre}$ of the reference point defined with respect to the first coordinate system so as to generate a rotated position $xpy_{centre}$, $xmy_{centre}$ for the reference point defined with respect to the second coordinate system. In this embodiment, this rotation is achieved in the following way:

$$xpy_{centre} = x_{centre} + y_{centre}$$

$$xmy_{centre} = x_{centre} - y_{centre}$$

As will be appreciated, the above equations are equivalent to applying a rotation matrix as follows:

$$\begin{bmatrix} xmy_{centre} \\ xpy_{centre} \end{bmatrix} = \begin{bmatrix} \cos\theta & -\sin\theta \\ \sin\theta & \cos\theta \end{bmatrix} \begin{bmatrix} x_{centre} \\ y_{centre} \end{bmatrix}$$

together with an additional scaling achieved by multiplication by √2.

The additional scaling means that each rotated coordinate $xpy_{centre}$, $xmy_{centre}$ can be calculated by a single addition or subtraction. The scaling also cancels out the 1/√2 scaling applied to the barycentric coefficients as discussed above such that there is no overall scaling of the interpolated attribute data.

The rotated position coordinates $xpy_{centre}$, $xmy_{centre}$, barycentric coefficients ($i_{apb}$, $j_{apb}$; $i_{amb}$, $j_{amb}$, $i_c$, $j_c$) and perspective correction coefficients ($w_{apb}$; $w_{amb}$; $w_c$) are then used to determine barycentric coordinates ($i_{centre}$, $j_{centre}$) and a perspective correction value ($w_{centre}$) for the reference point using plane equations in the following manner:

$$i_{centre} = [i_{apb} * xpy_{centre}] + [i_{amb} * xmy_{centre}] + i_c$$

$$j_{centre} = [j_{apb} * xpy_{centre}] + [j_{amb} * xmy_{centre}] + j_c$$

$$w_{centre} = [w_{apb} * xpy_{centre}] + [w_{amb} * xmy_{centre}] + w_c$$

The rotated barycentric coefficients ($j_{apb}$, $j_{apb}$; $i_{amb}$, $j_{amb}$) and perspective correction values ($w_{apb}$; $w_{amb}$) are then respectively added to or subtracted from the barycentric coordinates ($i_{centre}$, $j_{centre}$) and perspective correction value ($w_{centre}$) for the reference point to generate barycentric coordinates ($i_0$, $j_0$; $i_1$, $j_1$; $i_2$, $j_2$; $i_3$, $j_3$) and perspective correction values ($w_0$; $w_1$; $w_2$; $w_3$) for the sampling points of the quad 65 in the following manner:

$$[i_0, j_0] = [i_{centre} - i_{apb}, j_{centre} - j_{apb}]$$

$$[i_1, j_1] = [i_{centre} + i_{amb}, j_{centre} + j_{amb}]$$

$$[i_2, j_2] = [i_{centre} - i_{amb}, j_{centre} - j_{amb}]$$

$$[i_3, j_3] = [i_{centre} + i_{apb}, j_{centre} + j_{apb}]$$

$$w_0 = w_{centre} - w_{apb}$$

$$w_1 = w_{centre} + w_{amb}$$

$$w_2 = w_{centre} - w_{amb}$$

$$w_3 = w_{centre} + w_{apb}$$

If desired, perspective correction is then applied to the barycentric coordinates ($i_0$, $j_0$; $i_1$, $j_1$; $i_2$, $j_2$; $i_3$, $j_3$) using the perspective correction values ($w_0$; $w_1$; $w_2$; $w_3$) for the sampling points of the quad 65 in the following manner:

$$[i_0, j_0] = [i_0/w_0, j_0/w_0]$$

$$[i_1, j_1] = [i_1/w_1, j_1/w_1]$$

$$[i_2, j_2] = [i_2/w_2, j_2/w_2]$$

$$[i_3, j_3] = [i_3/w_3, j_3/w_3]$$

In this embodiment, applying the perspective correction also normalises the barycentric coordinates ($i_0$, $j_0$; $i_1$, $j_1$; $i_2$, $j_2$; $i_3$, $j_3$). The (perspective corrected) barycentric coordinates ($i_0$, $j_0$; $i_1$, $j_1$; $i_2$, $j_2$; $i_3$, $j_3$) for the sampling points of the quad 65 are then output by the barycentric evaluator 75 to the barycentric coordinate cache 72.

The attribute evaluator 76 of the varying interpolator 42 then accesses the perspective corrected barycentric coordinates ($i_0$, $j_0$; $i_1$, $j_1$; $i_2$, $j_2$; $i_3$, $j_3$) stored in the barycentric coordinate cache 72 and the vertex shaded attribute data for the primitive 60 stored in the attribute cache 73.

The attribute evaluator 76 then derives interpolated attribute data ($S_0$, $S_1$, $S_2$, $S_3$) for the sampling points of the quad 65 by interpolation using the barycentric coordinates ($i_0$, $j_0$;

$i_1, j_1; i_2, j_2; i_3, j_3$) for each sampling point. The interpolation in effect comprises multiplying each barycentric coordinate ($i_0, j_0; i_1, j_1; i_2, j_2; i_3, j_3$) by a corresponding vertex shaded attribute value ($S_i, S_j, S_k$, e.g. a colour value, a transparency value, a texture coordinate, etc.) for the vertex to which that barycentric coordinate relates, and then summing the results of the multiplications. In the present embodiment, this is achieved in the following manner:

$$S_0 = S_{i\_new} * i_0 S_{j\_new} * j_0 + S_k$$

$$S_1 = S_{i\_new} * i_1 + S_{j\_new} * j_1 + S_k$$

$$S_2 = S_{i\_new} * i_2 + S_{j\_new} * j_2 + S_k$$

$$S_3 = S_{i\_new} * i_3 S_{j\_new} * j_3 + S_k$$

where $S_{1\_new} = S_i - S_k$ and $S_{j\_new} = S_j - S_k$.

The values of $S_{i\_new}$ and $S_{j\_new}$ are determined in advance by the varying pipeline 70 from the vertex shaded attribute data and stored in the attribute cache 73 for use when deriving the interpolated attribute data ($S_0, S_1, S_2, S_3$) for the sampling points. The interpolated attribute data ($S_0, S_1, S_2, S_3$) is then output by the attribute evaluator 76 of the varying interpolator 42 to the programmable execution unit 41 in a varying result message 78.

The interpolated attribute data ($S_0, S_1, S_2, S_3$) can then be used by subsequent stages of the graphics processing pipeline, such as the texture mapper 43 (e.g. that samples a texture using interpolated attribute data in the form of interpolated texture coordinates) or the blender 29 (e.g. that carries out a blending operation using interpolated attribute data in the form of interpolated colours).

It can be seen from the above that the technology described herein, in embodiments, provides a graphics processing system that allows interpolated attribute data to be generated more efficiently for plural sampling points. This is achieved, in embodiments, by generating the interpolated attribute data for the sampling points using a reference position for the sampling points together rotated sampling point delta values.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing system that includes a fragment shading stage which processes vertex shaded attribute data for primitives so as to generate interpolated attribute data for sampling points, the method comprising:
generating sampling point delta values for a primitive; and
generating interpolated attribute data for at least one sampling point of a group of plural sampling points which are being used to sample the primitive;
wherein the interpolated attribute data for the at least one sampling point is generated using a position of a reference point for the group of plural sampling points together with at least one of the sampling point delta values;
wherein the position of the reference point for the group of plural sampling points is defined with respect to a first coordinate system having a first set of axes, wherein the sampling point delta values for the primitive are defined with respect to a second coordinate system having a second set of axes that are rotated relative to the first set of axes of the first coordinate system, and wherein each sampling point delta value for the primitive relates to a change in a value to be interpolated when sampling the primitive with respect to a unit step along one of the axes of the second coordinate system.

2. A method as claimed in claim 1, wherein the second set of axes of the second coordinate system are rotated by 45° or multiples thereof relative to the first set of axes of the first coordinate system.

3. A method as claimed in claim 1, wherein the reference point is positioned centrally with respect to the sampling points of the group of plural sampling points.

4. A method as claimed in claim 1, wherein generating the sampling point delta values comprises:
generating sampling point delta values defined with respect to the first coordinate system; and
rotating the sampling point delta values defined with respect to the first coordinate system so as to generate sampling point delta values defined with respect to the second coordinate system.

5. A method as claimed in claim 1, wherein the sampling point delta values comprise barycentric coefficients defined with respect to the second coordinate system.

6. A method as claimed in claim 1, wherein using the position of the reference point comprises determining barycentric coordinates for the reference point from the position of the reference point.

7. A method as claimed in claim 6, wherein at least one of the sampling point delta values is added to or subtracted from the barycentric coordinates for the reference point to generate barycentric coordinates for the at least one sampling point.

8. A method as claimed in claim 7, further comprising using the barycentric coordinates for the at least one sampling point to derive interpolated attribute data for the at least one sampling point.

9. A method as claimed in claim 1, wherein the group of plural sampling points has a pattern selected from the group consisting of: Ordered 4×; Rotated 4×; and Direct3D 8×.

10. A graphics processing system that includes a fragment shading stage which is configured to process vertex shaded attribute data for primitives so as to generate interpolated attribute data for sampling points, the system comprising processing circuitry configured to:
generate sampling point delta values for a primitive; and
generate interpolated attribute data for at least one sampling point of a group of plural sampling points which are being used to sample the primitive;
wherein the processing circuitry is configured to generate the interpolated attribute data for the at least one sampling point using a position of a reference point for the group of plural sampling points together with at least one of the sampling point delta values;
wherein the position of the reference point for the group of plural sampling points is defined with respect to a first coordinate system having a first set of axes, and wherein the sampling point delta values for the primitive are defined with respect to a second coordinate system having a second set of axes that are rotated relative to the first set of axes of the first coordinate system, and wherein each sampling point delta value for the primitive relates to a change in a value to be interpolated when sampling the primitive with respect to a unit step along one of the axes of the second coordinate system.

11. A graphics processing system as claimed in claim 10, wherein the second set of axes of the second coordinate system are rotated by 45° or multiples thereof relative to the first set of axes of the first coordinate system.

12. A graphics processing system as claimed in claim 10, wherein the reference point is positioned centrally with respect to the sampling points of the group of plural sampling points.

13. A graphics processing system as claimed in claim 10, wherein when generating the sampling point delta values the processing circuitry is configured to:
   generate sampling point delta values defined with respect to the first coordinate system; and
   rotate the sampling point delta values defined with respect to the first coordinate system so as to generate sampling point delta values defined with respect to the second coordinate system.

14. A graphics processing system as claimed in claim 10, wherein the sampling point delta values comprise barycentric coefficients defined with respect to the second coordinate system.

15. A graphics processing system as claimed in claim 10, wherein when using the position of the reference point the processing circuitry is configured to determine barycentric coordinates for the reference point from the position of the reference point.

16. A graphics processing system as claimed in claim 15, wherein the processing circuitry is configured to add at least one of the sampling point delta values to, or subtract at least one of the sampling point delta values from, the barycentric coordinates for the reference point to generate barycentric coordinates for the at least one sampling point.

17. A graphics processing system as claimed in claim 16, wherein the processing circuitry is configured to use the barycentric coordinates for the at least one sampling point to derive interpolated attribute data for the at least one sampling point.

18. A graphics processing system as claimed in claim 10, wherein the group of plural sampling points has a pattern selected from the group consisting of: Ordered 4×; Rotated 4×; and Direct 3D 8×.

19. A non-transitory computer readable storage medium storing computer software code which, when executing on a processor of a graphics processing system that includes a fragment shading stage which is configured to process vertex shaded attribute data for primitives so as to generate interpolated attribute data for sampling points, performs a method comprising:
   generating sampling point delta values for a primitive; and
   generating interpolated attribute data for at least one sampling point of a group of plural sampling points which are being used to sample the primitive;
   wherein the interpolated attribute data for the at least one sampling point is generated using a position of a reference point for the group of plural sampling points together with at least one of the sampling point delta values;
wherein the position of the reference point for the group of plural sampling points is defined with respect to a first coordinate system having a first set of axes, and wherein the sampling point delta values for the primitive are defined with respect to a second coordinate system having a second set of axes that are rotated relative to the first set of axes of the first coordinate system, and wherein each sampling point delta value for the primitive relates to a change in a value to be interpolated when sampling the primitive with respect to a unit step along one of the axes of the second coordinate system.

* * * * *